Dec. 6, 1960 C. H. SCHAMEL ET AL 2,963,075
SEAT ADJUSTER
Filed Sept. 9, 1954 4 Sheets-Sheet 1
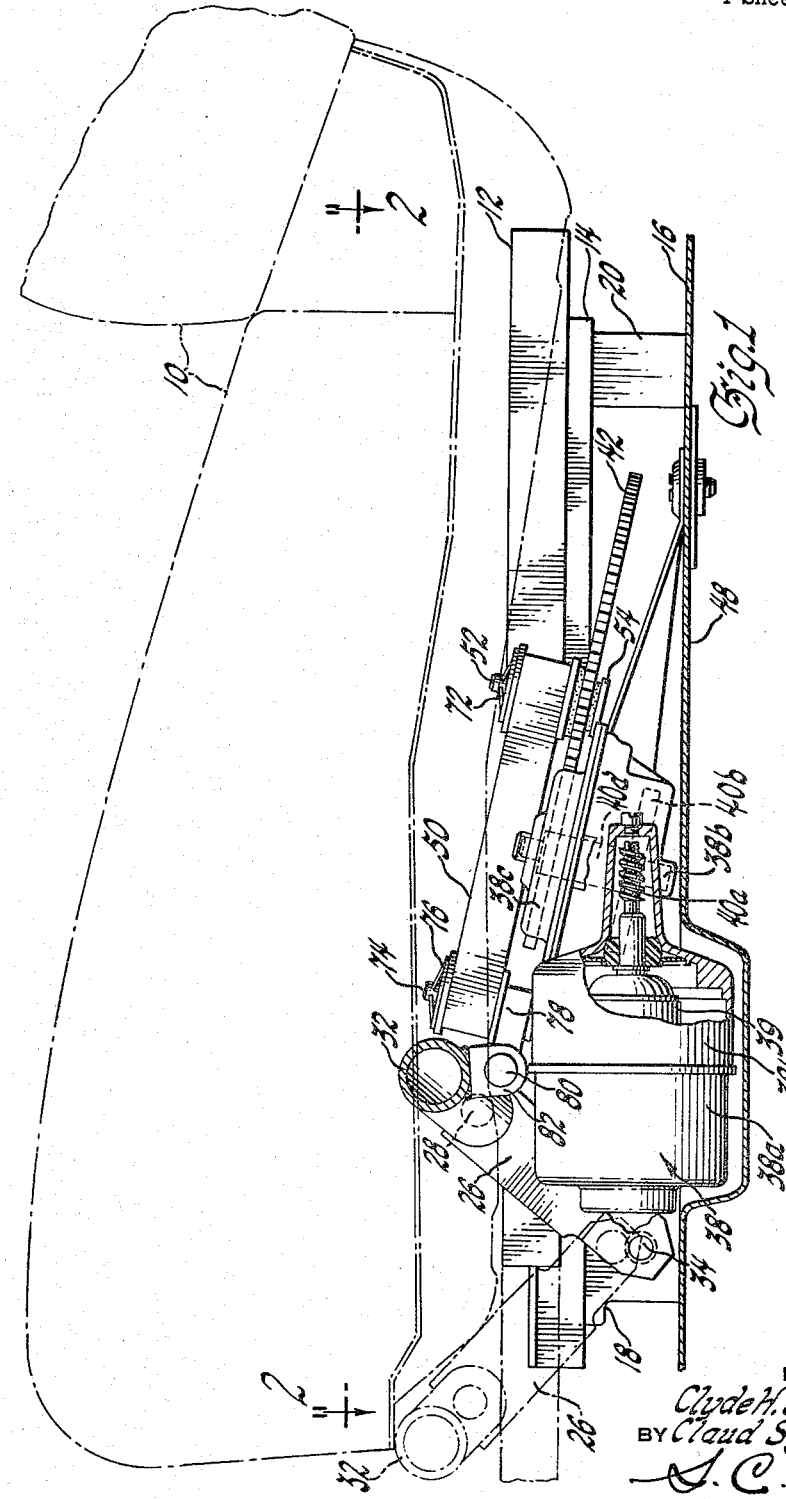
INVENTORS
Clyde H. Schamel, &
BY Claud S. Semar
J. C. Thorpe
ATTORNEY Dec. 6, 1960  C. H. SCHAMEL ET AL  2,963,075
SEAT ADJUSTER
Filed Sept. 9, 1954  4 Sheets-Sheet 2

INVENTORS
Clyde H. Schamel, &
BY Claud S. Semar
J.C. Thorpe
ATTORNEY

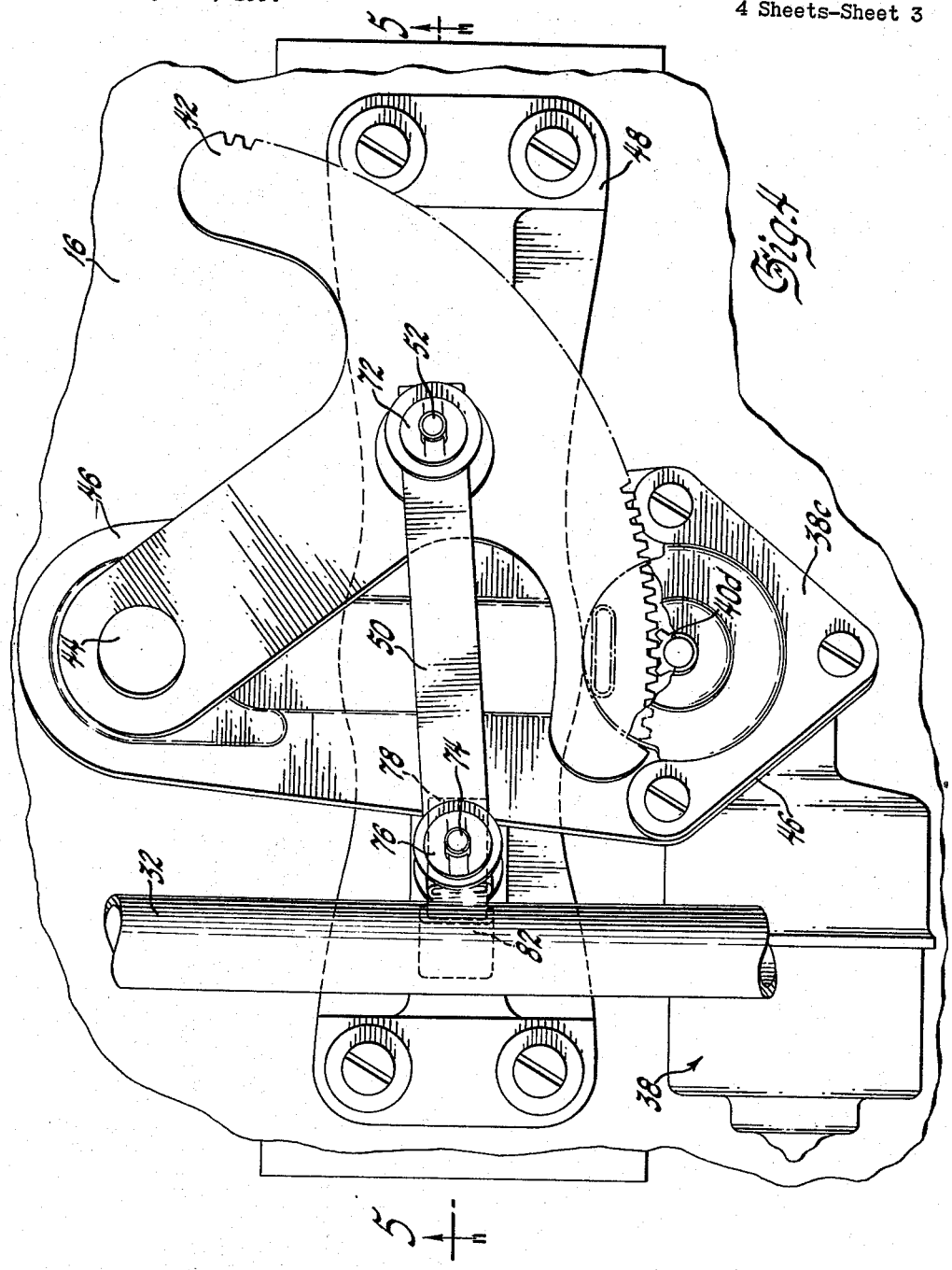

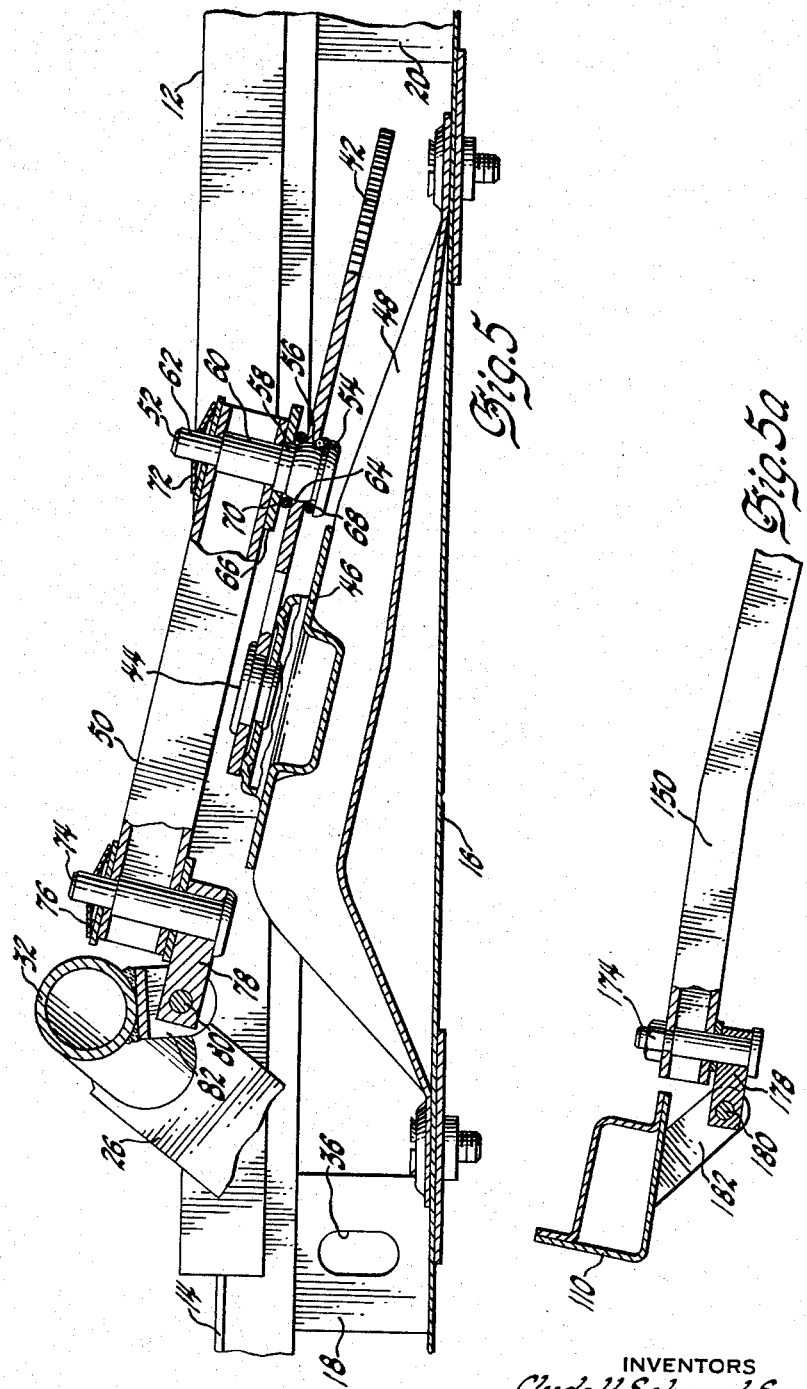

United States Patent Office 2,963,075
Patented Dec. 6, 1960

2,963,075
SEAT ADJUSTER

Clyde H. Schamel, Royal Oak, and Claud S. Semar, Birmingham, Mich., assignors to General Motors Corporation, Detroit, Mich., a corporation of Delaware Filed Sept. 9, 1954, Ser. No. 455,017

10 Claims. (Cl. 155—14)

This invention relates to adjustable seats and more particularly to power means for fore-and-aft adjustment of a vehicle seat.

In order to facilitate the fore-and-aft movement of a vehicle seat, it is desirable to employ remotely controlled power means for shifting the seat between its fore-and-aft positions. This permits the driver, even while operating the vehicle, to control the position of the seat at a proper and comfortable distance from the vehicle controls, such as the brake and accelerator pedals and steering wheel. Although there have been power operated seat adjusters devised for this purpose, they have been subject to numerous objections and are generally very complicated. This results in a power seat adjuster which is not pratical from a commercial standpoint since it is too expensive and unreliable to be generally accepted by the public.

It is proposed to provide a simple power operated seat adjuster that will be economical to manufacture. The regulator is a self-contained assembly including a mounting frame or bracket which will permit the regulator to be installed on a vehicle as a factory-installed accessory or to be sold as an accessory for installation on fully assembled cars. The power means and actuating linkage for the regulators are constructed so as to be very reliable in operation and require the minimum amount of controls and related equipment.

When an electric motor is employed for driving a seat adjusting mechanism, it is necessary to employ a speed reducing gear train. In the past it has been the practice to place these speed reducing mechanisms in separate housings which may be secured either to the motor housing, the vehicle frame, or the seat frame. It is now proposed to employ a single housing having a speed-reducing gear portion and a motor portion formed therein which may be integrated into a self-contained seat adjusting mechanism which is economical to manufacture and contains the speed reduction mechanism, the motor, and the motion-translating mechanism.

It is also contemplated that the integral motor and speed-reducing mechanism employed may be interchangeable with similar units utilized in power operated windows and convertible top adjusting mechanisms incorporated in the same vehicle. Due to torque characteristics and the simplicity of control, a series electric motor is a highly desirable power source for such adjusting mechanisms. However, as there will be large variations in the amount of loading present in the various mechanisms to be adjusted, and particularly seats which may be shifted with or without passenger load, it is desirable to employ a motor which has a substantially constant speed regardless of load in such adjusting mechanisms. Accordingly, it is proposed to employ a seat adjusting power actuating mechanism having a series motor in which the motor may be provided with means that will produce a more constant speed regulation with a resultant uniform speed of adjustment.

It is also proposed to employ a seat adjuster power mechanism having friction means disposed to provide a frictional drag on the armature of the motor so that when it is desired to stop the seat in a certain position, the momentum of the high-speed electric motor will be dissipated as soon as the motor is shut off. Therefore, the tendency for the seat to overrun its position will be greatly reduced.

It is further proposed to employ a seat adjusting mechanism provided with a speed-reducing mechanism which is self-locking when the power supplied is disconnected from the motor. Thus, when the seat has been properly adjusted, the momentum of the passengers sitting on the adjusted seat during periods of rapid vehicle acceleration and deceleration will not cause fore-and-aft shifting of the seat.

From the foregoing it will be seen that one of the primary objects of this invention is the provision of a power operated seat adjusting mechanism which is both compact in construction and inexpensive to manufacture and which can be easily adapted to and mounted in a motor car without related auxiliary devices and special operations or changes in the car structure.

Another object of this invention is the provision of a motion transmitting mechanism in a seat adjusting mechanism which is adapted especially for operation by a high-speed electric motor and which is both simple in design as well as efficient and reliable in operation.

A further object of this invention is the provision of means for translating high-speed rotary motion supplied by an electric motor into relatively low-speed translatory motion for operating a seat adjusting mechanism or the like.

These and other objects of this invention are attained by providing a seat adjustably mounted on a support for fore-and-aft movement and having motion equalizing means co-operating with the seat and its support for guiding the seat in such adjusting movement, with a power actuating mechanism reacting between the equalizing means or the seat and the support to adjustably and selectively move the seat as guided by the equalizing means. The equalizing means includes an equalizing shaft or rod having a crank arm adjacent each end thereof which is journaled or otherwise pivotally connected at one end thereof to either the seat member or its support member. The opposite end of each crank arm is provided with a pivotal pin-and-slot connection with the other of said members. The power actuating mechanism is a self-contained unit mounted on the support and including a high-speed series electric motor; a speed reducing mechanism comprising a worm gear, a worm wheel, a spring plate braking rotation thereof when the motor is deenergized, and a pinion gear driven by the worm wheel; and a motion translating mechanism including a sector gear driven by the pinion gear and a connecting rod for universally interconnecting the equalizing shaft or the seat to a point adjacent the periphery of the sector gear.

The objects of the invention will be more clearly understood from the following description of a preferred embodiment thereof in which reference is made to the attached drawings, in which:

Figure 1 is a view in side elevation with parts broken away to show a power operable adjustable seat made in accordance with our invention taken substantially on the line 1—1 of Figure 2.

Figure 4 is an enlarged view of the power operating mechanism similar to the showing in Figure 2 with certain parts broken away, and Figure 5 is a sectional view taken substantially on the line 5—5 of Figure 4 while Figure 5a shows an alternative form of construction.

The same reference numerals are applied to corresponding parts throughout the views.

Figure 2:
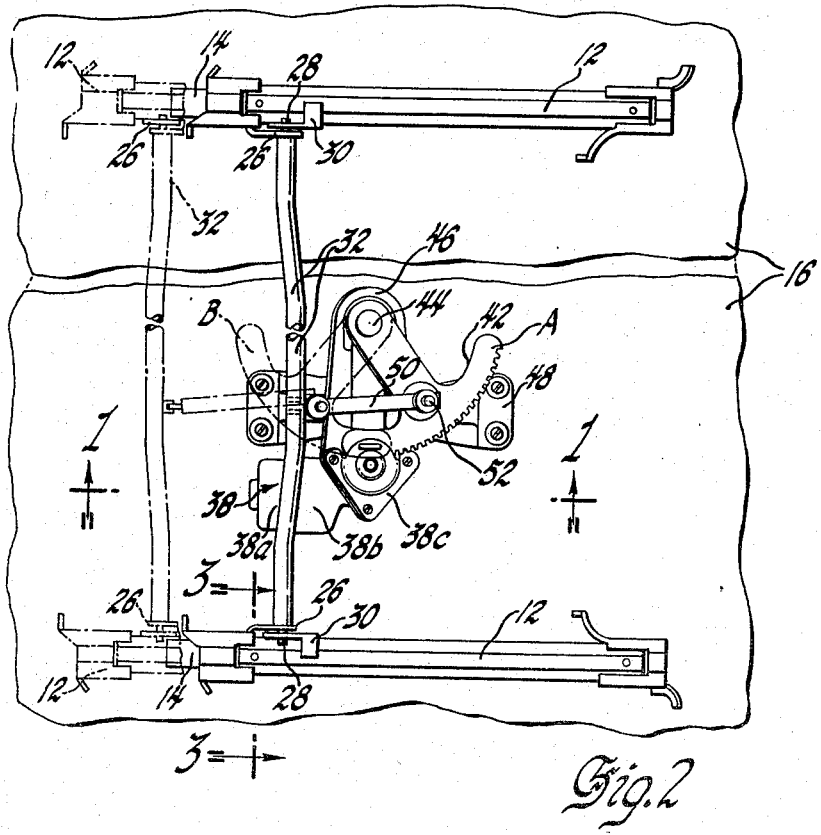
Figure 2 is a plan view of the seat adjuster taken on the line 2—2 of Figure 1 on a reduced scale.
Figure 3:
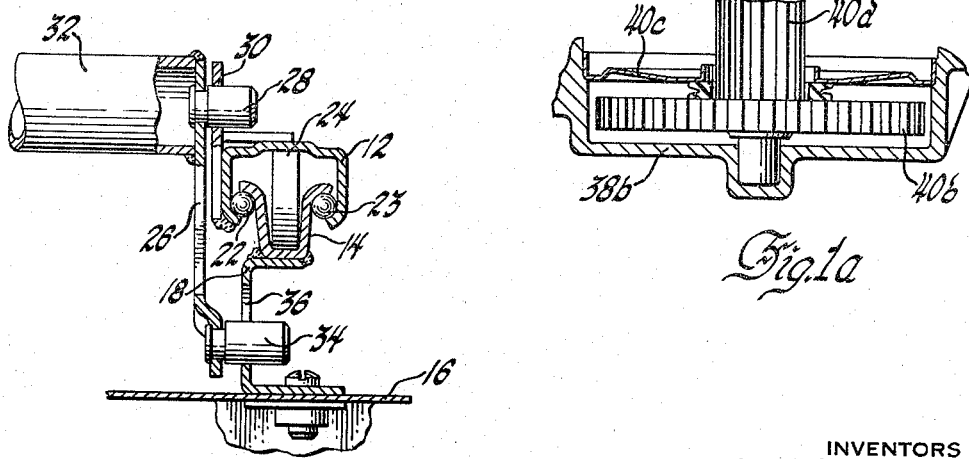
Figure 3 is an enlarged sectional view with certain portions broken away taken substantially on the line 3—3 of Figure 2.
Figure 1A:
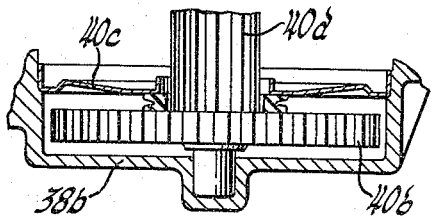
Figure 1a is an enlarged fragmentary view of a portion of Figure 1 with parts broken away and in section to show the speed-reducing mechanism in greater detail.

The seat 10 may be mounted on any conventional seat-slide structure, but in the instant embodiment, as best shown by Figures 1 to 3, each side of the seat underframe is provided with a downwardly facing channel-shaped track or rail member 12 riding on an upwardly facing channel-shaped rail or track member 14. The lower track members 14 are in turn supported above the floor panel 16 of the vehicle by a plurality of support brackets as indicated at 18 and 20. The flange portions of the channel-shaped upper and lower racks terminate in arcuately formed lip portions to form ball-bearing races for ball bearings interposed therebetween as indicated at 22 and 23. The webs of the two channel-shaped track members constitute races for a number of anti-friction type roller bearings 24 interposed therebetween.

The motion equalizing mechanism provided to assure straight-line movement of the seat during its back-and-forth adjustment includes two reaction levers 26, each of which is pivotally connected by a pin 28 to a bracket 30 secured to the upper track member 12 of the underframe of the seat. The two levers 26 are interconnected by a motion equalizing torque rod or shaft 32 secured thereto adjacent their pivotal connections with the seat underframe. The opposite ends of the levers 26 are each provided with a pin 34 which engages a reaction slot 36 formed in the adjacent forward lower track supporting bracket 18 to form a slidable pivotal connection between the lever and the seat supporting members.

The power actuating mechanism for the adjustable seat includes a mounting frame or bracket formed of the crossed members 46 and 48. An integral motor and speed-reduction gear unit 38 is mounted on one arm of the bracket member 46 which is in turn supported above the vehicle floor panel or frame 16 by the bracket member 48. The integral motor and reduction gear unit 38 comprises a casing formed of housing members 38a, 38b, and 38c; a high speed reversible series motor 39, a motor driven worm 40a, a worm wheel 40b driven thereby, a spring plate 40c engaging the worm wheel and braking rotation thereof when the motor is deenergized, and a pinion gear 40d driven by the worm wheel. A sector gear 42 is pivotally mounted at 44 on the other arm of the bracket member 46 to engage the pinion 40d and is reversibly driven thereby. A tubular connecting rod or pitman 50 is universally connected to the sector gear 42 by a pin 52, as best shown in Figures 4 and 5. The lower end of the pin 52 has a head portion 54, a bulbous or spherical shank portion 56 spaced therefrom, and three stepped cylindrical portions 58, 60, and 62. The bulbous portion 56 of the pin 52 is embraced by a hole 64 formed in the arm of the sector gear adjacent the periphery thereof. A washer 66 embraces the largest diameter cylindrical portion 58 of the pin 52 and two annular O-rings 68 and 70 are interposed between the head 54 and the lower face of the sector gear 42 and between the washer 66 and the upper face of the gear 42. The connecting rod is formed with aligned holes of different diameters which embrace the stepped portions 60 and 62 of the pin 52. The shoulders formed by these stepped portions are drawn into abutting relation with the sides of the holes in the connecting rod by a threadless sheet metal nut 72. It will readily be seen that this structure constitutes a universal joint comprising a ball-and-socket type connection between the sector gear and the connecting rod and the pivotal pin connection.

As shown in Figures 1, 2, 4 and 5, the opposite end of the connecting rod 50 is also universally connected to the equalizer rod 32. The connecting rod is provided with two holes of different diameter having a pin 74 extending therethrough in parallel relation to the pin 52. The pin 74 is retained in place axially by a nut 76 similar to 72 which draws a shoulder formed on the pin by a reduced diameter portion into abutting relation with the sides of the smaller diameter hole. A short link member 78 is pivoted on the opposite end of the pin 74 and about a pivot pin 80 carried by a yoke-shaped bracket 82 secured to the equalizing shaft 32. The pivotal connections of the link 78 about the horizontal axis of the pivot pin 80 and the axis of the pin 74 which is normal thereto provides a universal connection between the connecting rod 50 and the equalizing shaft 32. As shown in Figure 5a the seat actuating power means may alternatively be universally connected to the seat underframe. In this modified form a bracket 182 is secured to the seat underframe 110. An elongated connecting rod 150 similar to the connecting rod 50 is universally connected to the bracket 182 by a short link member 178 pivotally connected to the bracket 182 by a horizontally disposed pin 180 therein and to the connecting rod about a vertical axis by a pin 174.

The reversible electric motor 39 is connected to the vehicle power supply, not shown, through a three-way switch, also not shown, which is operable to selectively energize the motor to shift the sector gear 42 in either a clockwise direction for shifting the seat forward or in a counterclockwise direction for shifting the seat rearwardly of the vehicle. The movement of the sector gear in the fore-and-aft direction is transmitted through the connecting rod to the equalizing shaft or rod to the upper track members secured to the seat underframe in the form of Figure 1 or directly to the seat underframe in the form shown in Figure 5a. In either form when the equalizing rod is shifted back and forth, the two crank arm levers 26 on the equalizing shaft are caused to rotate equally about their slidable pivotal connections with the seat supporting member and about their respective pivotal connections 28 and 34 with the upper track members. This insures the well-guided equal movement of both sides of the seat during the adjusting movement.

In addition to the inherent limiting action of the slots 36 upon the fore-and-aft seat adjustment, the track members are provided with suitable stops, not shown, and the motor circuits, also not shown, may be provided with suitable movement-responsive switches or current-responsive relays to prevent motor overtravel or overloading, respectively. The spring plate 40c through its engagement with the worm wheel 40d provides a frictional drag on the armature of the motor so that when it is desired to stop the seat in a certain position, the momentum of the high-speed electric motor will be dissipated as soon as the motor is shut off. By this means the tendency of the seat to overrun its selected position will be greatly reduced. The pitch of the motor driven worm 40a is such that the worm is non-rotatable when the power is disconnected from the motor. This renders the seat adjusting power mechanism self-locking to prevent fore-and-aft shifting of the adjusted seat as a result of pushing or pulling of the seat or as a result of inertia effects during periods of rapid vehicle acceleration or deceleration.

From the foregoing description and the accompanying drawings, it will be observed that the adjustment of the seat forwardly and rearwardly may be affected with little effort and that the arrangement is practical and efficient. While the foregoing description has been given in detail for clarity and ease of the understanding, it is not the intention thereby to restrict the invention since the inventive principles herein involved are capable of assuming other physical embodiments without departing from the spirit of the invention or the scope defined in the appended claims.

We claim:

1. In a motor vehicle having a support element, a seat element mounted thereon for fore-and-aft movement, and motion equalizing means cooperating with the seat and its support for guiding the seat in such movement; power means connected to said equalizing means to selectively effect fore-and-aft movement of said seat with respect to said support, said power means including an electric motor, reduction gearing including a sector gear driven by said motor, a connecting rod universally connecting said equalizing means and said sector gear, and means associated with said reduction gearing for locking said gearing and said motor when said motor is deenergized.

2. In a motor vehicle having a support element and a seat element mounted thereon for back-and-forth movement, motion equalizing means cooperating with the seat and its support for guiding the seat in such movement and including a shaft journaled on one of the first two elements, said shaft having crank arms on its opposite ends pivotally connected to the other element, and power means connected to said equalizing shaft to selectively rock the same about its pivotal connections with said seat and said support to adjustably move the seat, said power means including an electric motor, reduction gearing including a sector gear and driven by said motor, and a connecting rod universally connecting said equalizing shaft and said sector gear.

3. In a motor vehicle having a support and a seat mounted thereon for back-and-forth movement; motion equalizing means co-operating with the seat and its support at opposite sides of the seat for guiding the seat in such movement and including a shaft journaled on the seat and having crank arms at its ends having a pin-and-slot pivotal connection with said support, and power means reacting between said seat and said support to adjustably move the seat as guided by said equalizing means, said power means including a secondary support member, a rotary motor, a sector gear mounted on said secondary support member, a speed-reducing gear means drivingly interconnecting said motor and said sector gear, and a connecting rod universally interconnecting said seat equalizing shaft and said sector gear.

4. In a motor vehicle having a support, a seat mounted thereon for back-and-forth movement, and motion equalizing means co-operating with the seat for guiding the seat in such movement, power means reacting between said seat and said support to adjustably move the seat as guided by said equalizing means, said power means including a secondary support member, a motor and a sector gear mounted on said secondary support member, speed reducing gear means drivingly interconnecting said motor to said sector gear, and means operatively interconnecting said seat and said sector gear.

5. In an adjustable seat having a support element and a seat element mounted thereon for back-and-forth movement, motion equalizing means co-operating with the seat and its support at opposite sides of the seat for guiding the seat in such movement, and power means universally reacting between said seat and said support to adjustably move the seat as guided by said equalizing means, said power means including an electric motor, a sector gear, reduction gearing drivingly interconnecting said motor and said sector gear, and a connecting rod universally connecting said equalizing means and said sector gear.

6. In an adjustable seat having a support, a seat, and seat carrying means for mounting said seat on said support for equalized back-and-forth movement, power means universally connected to said seat carrying means to adjustably move the seat, said power means including a rotary motor, a sector gear, reduction gearing drivingly interposed between said motor and said sector gear, said reduction gearing including friction means for locking said sector gear in its adjusted position when said motor is deenergized, and a connecting rod universally interconnecting said seat carrying means and said sector gear.

7. In an adjustable seat having a support, a plurality of rail members mounted on said support, a seat, and a second plurality of rail members attached to said seat and adjustably mounting said seat on said first plurality of rails for fore-and-aft movement, the combination comprising an equalizer rod journaled in one or more of said second rail members located on opposite sides of said seat, and power means universally interposed between said seat and said support to adjustably move the seat fore and aft, said power means including an integral high speed rotary motor and reduction gearing, said reduction gearing being self-locking and having power absorption means associated therewith for dissipating the momentum of the rotary motor when the motor is deenergized, and reaction means co-operating with said equalizer rod for guiding the seat in such fore-and-aft movement, said reaction means including a plurality of spaced crank arms secured to said equalizer rod, each of said crank arms having a pin-and-slot pivotal connection with said support at the end thereof.

8. In an adjustable seat having a support, a plurality of rail members mounted on said support, a seat, a second plurality of rail members attached to said seat and adjustably mounting said seat on said first plurality of rails for fore-and-aft movement, the combination comprising an equalizer rod journaled in one or more of said second rail members located on opposite sides of said seat, power means interposed between said equalizer rod and said support to adjustably move the seat fore and aft, said power means including a high speed rotary motor, self-locking reduction gearing integral with said motor, and said reduction gearing including an output gear adapted to be oscillated through a limited radial sector by the operation of said motor and gearing, a connecting rod universally connected at one end to said equalizing rod and at its opposite end to said output gear and adapted to translate the oscillation of said output gear into fore-and-aft movement of said equalizing rod, and reaction means co-operating with the journaled ends of said equalizer rod for guiding the seat in such fore-and-aft movement.

9. In an adjustable motor vehicle seat having a support element and a seat element mounted thereon for adjustable movement, the combination, comprising motion equalizing means co-operating with the seat and its support for guiding the seat in such movement, said equalizing means including a shaft journaled at its opposite ends on one of the first two elements and a crank arm secured to said shaft and pivotally connected to said other element at its end, and rotary power means reacting between said equalizing shaft and said support to adjustably move the seat as guided by said equalizing means, said power means including a rotary motor, a self-locking and self-braking speed-reduction gear means driven thereby, a sector gear driven by said gear means, and a connecting rod universally connecting said equalizing shaft and said sector gear.

10. The invention as recited in claim 7, said power means including a sector gear driven by said reduction gearing and a connecting rod universally connecting said equalizing shaft and said sector gear.

References Cited in the file of this patent

UNITED STATES PATENTS

| | | |
|---|---|---|
| 1,487,660 | Kingston et al. | Mar. 18, 1924 |
| 2,256,818 | Sperry | Sept. 23, 1941 |
| 2,274,448 | Hoover | Feb. 24, 1942 |
| 2,286,108 | Rousseau et al. | June 9, 1942 |
| 2,308,212 | Scott-Iversen et al. | Jan. 12, 1943 |
| 2,350,334 | Baker | June 6, 1944 |
| 2,558,140 | Kruzik | June 26, 1951 |
| 2,595,464 | Kaufmann | May 6, 1952 |
| 2,665,740 | Rappl | Jan. 12, 1954 |
| 2,679,889 | Barden et al. | June 1, 1954 |
| 2,684,108 | Rappl | July 20, 1954 |
| 2,765,024 | Brundage | Oct. 2, 1956 |
| 2,809,689 | Garvey et al. | Oct. 15, 1957 |

FOREIGN PATENTS

| | | |
|---|---|---|
| 700,498 | Great Britain | Dec. 2, 1953 |
| 840,048 | France | Jan. 11, 1939 |